April 22, 1969  A. S. RICHARDSON, JR  3,440,328
MEANS FOR DAMPING VIBRATIONS OF POWER TRANSMISSION LINES
Filed Dec. 29, 1967
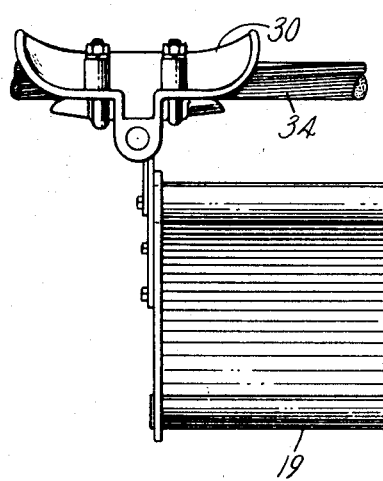
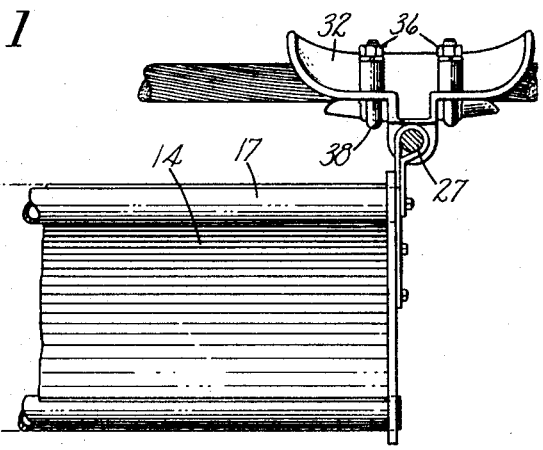
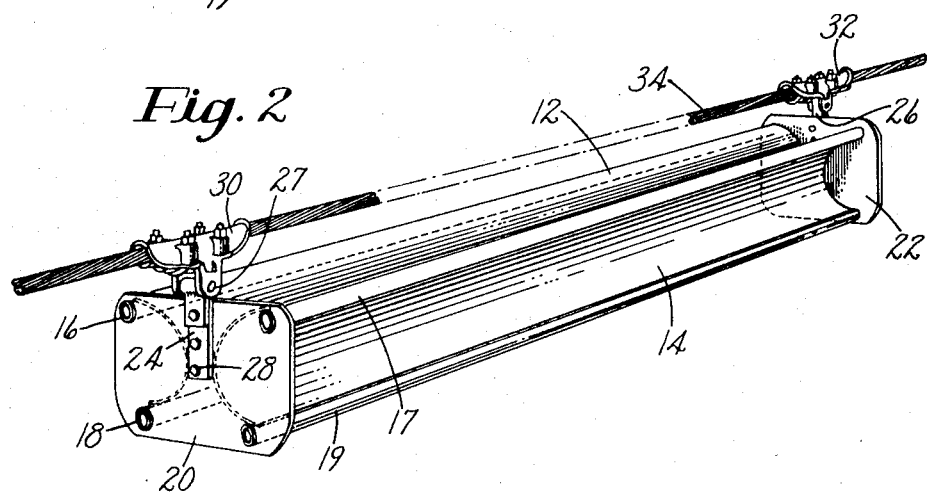
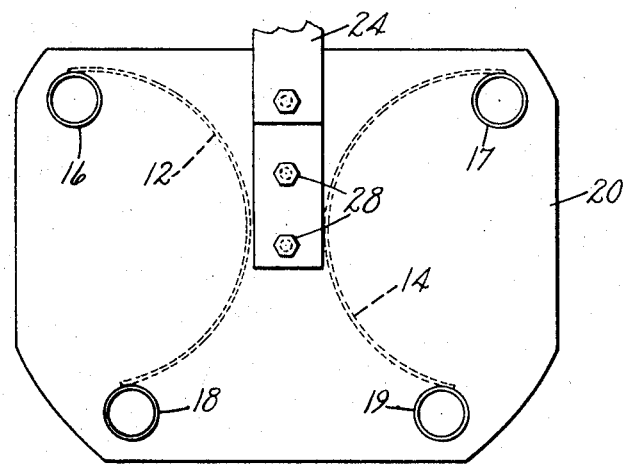
Inventor
Albert S. Richardson, Jr.
By his Attorney
George C. Fuller United States Patent Office 3,440,328
Patented Apr. 22, 1969

3,440,328
MEANS FOR DAMPING VIBRATIONS OF POWER TRANSMISSION LINES
Albert S. Richardson, Jr., Lexington, Mass., assignor to Sandamp Systems, Inc., Watertown, Mass., a corporation of Massachusetts
Filed Dec. 29, 1967, Ser. No. 694,746
Int. Cl. H02g 7/14
U.S. Cl. 174—42                    11 Claims

ABSTRACT OF THE DISCLOSURE

An aerodynamic damper is provided for suppressing wind induced galloping vibrations of suspended lines, such as overhead electric transmission lines, the damper having improved characteristics of lift and drag for enhancing its damping action. The damper comprises body means rigidly defining an elongated surface and means for attaching the body means to a suspended line. Suitably the body means defines channels opening in opposite directions.

BACKGROUND OF INVENTION

Field of invention

This invention relates to suppressing wind induced vibrations of suspended lines such as overhead electric lines and particularly to suppressing the type of vibration commonly known as galloping.

Description of prior art

Galloping, i.e., large amplitude vibration, of an overhead line is caused by the introduction of mechanical energy into a line span by the operation of wind forces produced where the line is made non-symmetrical, for example, by the accumulation of ice in certain cross-sections.

A discussion of the galloping phenomenon by J. P. Den Hartog is set forth in Mechanical Vibrations, 3rd ed., pp. 368 et seq. (McGraw-Hill, 1947). A brief statement based on this discussion will herein be given as an aid in understanding the invention.

Take for consideration a section of transmission line intermediate the ends of a span, the section being of arbitrary length. The section has freedom for movement or vibration which in general assumes an elliptical orbit. In the presence of a horizontal wind, when the line section is moving downward in its orbit, the relative wind appears to come from below at an angle to the horizontal plane designated the angle of attack, A, where $$A = \tan^{-1} \frac{v}{V}$$

and $v$ = downward velocity of the section and $V$ = horizontal speed of wind. The wind thus produces vertical components of lift L and drag D which produce an upward force F:

$$F = L \cos A + D \sin A$$

Certain shapes of ice formations may cause this force to vary with the angle of attack in such a way as to accentuate line vibration progressively to galloping. Den Hartog shows that the critrion for dynamic instability is $$\frac{dF}{dA} < 0 \text{ (unstable)}$$

and $$\frac{dF}{dA} > 0 \text{ (stable)}$$

and that $$\frac{dF}{dA} \approx \frac{dF}{dA} + D$$

and accordingly a system is unstable when $$\frac{dL}{dA} + D < 0$$

In other words, a line section is dynamically unstable if the slope of the lift vs. angle of attack curve is negative and greater than the ordinate of the drag curve.

Since an aerodynamic damper is intended to suppress dynamic instability on the part of the conductor, it must, when attached to a line section, operate with the conductor as a system to present suitable characteristics of lift and drag. It is clear from the above criteria (and it is borne out by more complex energy budget analyses) that a high drag is desirable for damping.

It has been proposed heretofore to damp the vibrations of a line by attaching thereto a damper comprising a cylinder. While this damper has worked reasonably well, to obtian sufficient damping, a relatively long cylindrical body is required in order to obtain sufficient drag.

Accordingly, it is an object of the present invention to provide an aerodynamic damper for suspended lines for suppressing wind induced galloping vibrations, which damper will provide enhanced damping characteristics over previously known forms of dampers.

Another object of the present invention is to provide an aerodynamic damper for such lines, which damper will provide a larger value of drag per linear unit than other known damper including a cylindrical damper of equivalent diameter in order to promote its convenience and reduce costs.

Still another object of the present invention is to provide an aerodynamic damper for suspended lines which damper has a combination of large drag together with suitable lift characteristics, providing enhanced damping over substantially the entire range of wind speed (approximately 5–30 m.p.h.) in which the greatest probability of galloping occurs.

To these ends, and in accordance with a feature of the present invention, there is provided an improved aerodynamic damper for suspended lines comprising body means rigidly defining an elongated channel and means for attaching the body means to the line. Preferably the body means is formed with outwardly concave surfaces defining channels opening in approximately opposite direactions. Suitably the channels may extend along the sides of the body means substantially from end to end thereof. the damped has means, suitably brackets and clamps, for attaching the body means to a line.

I have found that a damper body means so formed provides approximately three times as much drag as a cylinder of equal height and length and that, at the same time, provides satisfactory lift curve characteristics in that the slope of this curve does not go sharply negative over a wide range of its angle of attack.

Suitably, and as illustrated, the body means comprises a pair of channel-defining rigid sheet members mounted in back to back co-extensive parallel relation. In the illustrated embodiment a small gap adapted for drainage purposes has been left between the members. This gap, in so far as aerodynamic considerations are concerned, may be eliminated entirely, for example, if it is desired to form the damper body means by extrusion of material in a gapless cross-section.

I have also found that a form of damper in which the top is wider than the bottom appears to have a somewhat better lift curve characteristic than one in which the top and bottom widths are equal.

BRIEF DESCRIPTION OF THE DRAWINGS

FIG. 1 is a side elevation, shortened by removing a center portion and approximating end portions, of an aerodynamic damper embodying the present invention;

FIG. 2 is an angular view of the damper shown in FIG. 1; and

FIG. 3 is a left end elevation with parts removed of the damper of FIG. 1.

DESCRIPTION OF PREFERRED EMBODIMENTS

Referring to the figures, the damper of the present invention comprises an elongated body means 10 comprising a pair of channel-defining sheet metal members 12 and 14. The members 12 and 14 are mounted in back to back co-extensive parallel relation by attachment to tubes 16, 17, 18 and 19 extending between and welding to end plates 20 and 22. The outwardly concave surfaces of the members 12 and 14 define channels extending along the body means 10 from end to end thereof. As best seen in FIG. 3, the spacing between the upper pair of tubes 16 and 17 is wider than the spacing between the lower pair of tubes 18 and 19, and it will be seen that the top of the damper is accordingly wider than the bottom. When the body means is suspended from a line, the channels between upper and lower tubes open approximately horizontally (although slightly downward, see FIG. 3) in the absence of an impinging wind.

Means for attaching the body means 10 to a line comprises a pair of recurving straps 24 and 26, attached to the end plates 20 and 22, respectively, by crews 28. The straps 24 and 26 are supported in turn by pins 27 in conventional cable clamps 30 and 32 for providing a fixed connection to a line 34 by clamping means including nuts 36 threaded to U-bolts 38. However, any suitable means for mounting the members 12 and 14 and for attaching the body means 10 to a line may be used. It is not necessary to enclose the ends of the troughs formed by the side members and thus, for example, a frame of steel rod may be substituted for the end plates, if desired. In general it is preferred to connect the body means fixedly to a line to take advantage of the stabilizing influence produced by twisting reaction of the line and of the dissipation of energy into the line, for example, by hysteresis of the strands involved in the twisting and untwisting of a cable.

Having thus described my invention, what I claim as new and desire to secure by Letters Patent of the United States is:

1. In the combination including a suspended line and body means cooperative therewith for suppressing wind induced vibrations of said line, the improvement wherein said body means rigidly defines an elongated channel and said combination additionally comprises means for attaching said body means to said line, said attaching means being operative to maintain said body means oriented with said channel opening approximately horizontally in the absence of an impinging wind.

2. Apparatus as defined in claim 1 in which said attaching means is operative to suspend said body means in spaced relation with said line.

3. Apparatus as defined in claim 2 in which said attaching means include means for providing a fixed connection with the line.

4. Apparatus as defined in claim 2 in which said attaching means comprises a plurality of brackets and means for connecting the brackets to a line at spaced locations.

5. Apparatus as defined in claim 1 in which said body means defines at least two elongated channels opening in approximately horizontal and opposite directions.

6. Apparatus as defined in claim 1 in which said body means and attaching means form with said line an aerodynamic system having in the presence of a substantially horizontal wind, a high drag and a positive rate of change of lift with respect to angle of attack over a wide range of said angle of attack.

7. An aerodynamic damper for suppressing wind induced vibrations of suspended lines such as overhead electric conductors, said damper comprising, in combination, body means and means for attaching said body means to a line, said body means including a pair of curved rigid sheet members disposed in back to back parallel relation and defining a top and sides of the body means and a pair of channels opening sideways in approximately opposite directions.

8. Apparatus as defined in claim 7 in which said members are disposed in spaced relation.

9. Apparatus as defined in claim 7 in which said body means comprises a pair of channel-defining rigid sheet members mounted in back to back co-extensive parallel relation and in which said attaching means comprises a pair of brackets extending from said body means and provided with clamping means for fixedly attaching the body means to said line in spaced parallel relation therewith with the channels opening approximately horizontally.

10. Apparatus as defined in claim 9 in which said body means is wider at the top than at the bottom.

11. Apparatus as defined in claim 7 in which said body means is wider at the top than at its bottom.

References Cited

UNITED STATES PATENTS

| 1,997,154 | 4/1935 | Schmitt | 174—42 |
| 2,694,101 | 11/1954 | Shuhart | 174—42 |
| 3,048,649 | 8/1962 | McGavern | 174—42 |

FOREIGN PATENTS

| 355,543 | 8/1931 | Great Britain. |

LARAMIE E. ASKIN, *Primary Examiner.*